(12) United States Patent
Nakashio et al.

(10) Patent No.: US 6,704,178 B2
(45) Date of Patent: Mar. 9, 2004

(54) MULTICHANNEL MAGNETIC HEAD USING MAGNETORESISTIVE EFFECT

(75) Inventors: Eiji Nakashio, Miyagi (JP); Seiji Onoe, Miyagi (JP); Junichi Sugawara, Miyagi (JP)

(73) Assignee: Sony Corporation, Tokyo (JP)

(*) Notice: Subject to any disclaimer, the term of this patent is extended or adjusted under 35 U.S.C. 154(b) by 100 days.

(21) Appl. No.: 10/092,911

(22) Filed: Mar. 7, 2002

(65) Prior Publication Data

US 2002/0131217 A1 Sep. 19, 2002

(30) Foreign Application Priority Data

Mar. 14, 2001 (JP) ........................................ P2001-072544

(51) Int. Cl.[7] ................................................. G11B 5/39
(52) U.S. Cl. ..................... 360/324.2; 360/319; 360/322
(58) Field of Search ................................. 360/314, 317, 360/318, 319, 324.2

(56) References Cited

U.S. PATENT DOCUMENTS 6,185,080 B1 * 2/2001 Gill .......................... 360/324.2
6,501,725 B2 * 12/2002 Aratani ....................... 369/126
6,567,244 B1 * 5/2003 Gill ............................ 360/314
6,590,803 B2 * 7/2003 Saito et al. ................. 365/158

\* cited by examiner

*Primary Examiner*—Jefferson Evans
(74) *Attorney, Agent, or Firm*—Sonnenschein, Nath & Rosenthal LLP

(57) ABSTRACT

A multichannel magnetic head utilizing the magnetoresistive effect comprises a plurality of magnetoresistive effect type reproducing magnetic head elements arrayed between a first and second magnetic shield and electrodes wherein the reproducing magnetic head elements are arrayed in parallel on at least the first magnetic shield and electrode. Electrodes on one side are constructed commonly by the first magnetic shield and led out as a single common terminal decreasing the number of terminals. Therefore, the number of the terminals in the multichannel magnetic head using the magnetoresistive effect can be decreased, the multichannel magnetic head can be miniaturized, the occurrence of a short-circuit between the terminals or between the leads can be removed, the occurrence of fluctuations of element characteristics can be removed, the multichannel magnetic head using the magnetoresistive effect can become highly reliable and a yield of the multichannel magnetic head using the magnetoresistive effect can be improved.

3 Claims, 10 Drawing Sheets

US 6,704,178 B2

MULTICHANNEL MAGNETIC HEAD USING MAGNETORESISTIVE EFFECT

BACKGROUND OF THE INVENTION

1. Field of the Invention

The present invention relates to a multichannel magnetic head using magnetoresistive effect, mounted on a drive apparatus for driving a magnetic recording medium such as a magnetic disk or a magnetic tape, in order to read out recorded information from a plurality of tracks on these magnetic recording media.

2. Description of Related Art

As a reproducing magnetic head for reading out recorded information from a magnetic recording medium such as a magnetic tape or a magnetic disk, for example, a magnetic head using magnetoresistive effect has widely been used as a high recording density reproducing head, in particular, because the magnetic head using magnetoresistive effect can obtain high sensitivity.

When the magnetic head using magnetoresistive effect is employed as the reproducing head as described above, a recording and reproducing head is comprised of a combination of a magnetic head using magnetoresistive effect and an electromagnetic induction type magnetic head, for example.

When a multichannel magnetic head is comprised of this recording and reproducing magnetic head, it is unavoidable that the number of terminals led out from the multichannel magnetic head increases enormously.

FIG. 1 of the accompanying drawings is a schematic diagram showing a magnetic tape drive apparatus to which a multichannel magnetic head using magnetoresistive effect according to the present invention can be applied.

As shown in FIG. 1, in a magnetic tape drive apparatus for driving a magnetic tape 101, the magnetic tape 101 is supplied from a magnetic tape supply reel 103 within a tape cassette 102, guided by a plurality of guide rollers 104 and wound around a magnetic tape take-up reel 105.

Then, during the magnetic tape 101 is being transported, a multichannel magnetic head 100 comes in slidable contact with the magnetic tape 101 to record and reproduce information on and from the magnetic tape 101 in a multichannel fashion.

FIG. 2 is a schematic plan view showing a main portion of this multichannel magnetic head 100, and FIG. 3 is a schematic cross-sectional view taken along the line III—III in FIG. 2, for example. As illustrated, in the multichannel magnetic head 100, a first magnetic shield 131 and a first magnetic gap layer 141 are formed on a first guard substrate 121, for example, and thereupon are parallelly disposed a plurality of magnetoresistive effect type reproducing magnetic head elements 106 facing the front end at which this magnetic head 100, for example, comes in slidable contact with a magnetic recording medium (not shown), i.e., a sliding surface S. Leads 106L made up of conductive layers respectively formed into required patterns are extended from sense current feeding electrodes toward the rear end edge on the opposite side of the sliding surface S.

On these reproducing magnetic head elements 106, there is formed an insulating layer 107, on which a second magnetic gap layer 142 having a predetermined thickness is formed. A second magnetic shield 132 is formed on the second magnetic gap layer 142.

Then, on the second magnetic shield 132, there are parallelly disposed electromagnetic induction type recording magnetic head elements 108 facing the sliding surface S corresponding to the respective reproducing magnetic head elements 106.

As shown in FIG. 3, each of the recording magnetic head elements 108 comprises an insulating non-magnetic layer 109 formed on the second magnetic shield 132, for example, a thin-film coil 110 formed on the insulating non-magnetic layer 109 and a belt-like magnetic core 111 formed on this thin-film coil 110 through an insulating e layer in such a manner that its front end faces the sliding surface S.

The magnetic core 111 has at the central portion of the thin-film coil 110 through-holes penetrating the non-magnetic layer 109 formed on the second magnetic shield 132 and an insulating layer formed on the non-magnetic layer 109. The respective magnetic cores 111 are magnetically coupled to the magnetic layers made up of the second magnetic shields 132 through these through-holes, and a closed magnetic circuit is formed of the magnetic core 111 and this magnetic layer. In this manner, there is constructed the electromagnetic induction type recording magnetic head element 108 around which the thin-film coil 110 is wound and in which a magnetic gap g is formed at the front end of this closed magnetic circuit by the non-magnetic layer 109 having a required thickness.

On these recording magnetic head elements 108, there is formed a non-magnetic insulating layer 112 on which a third magnetic shield 133 and a second guard substrate 122 are formed.

At that very time, the rear end edge of the insulating non-magnetic layer 109, for example, is exposed to the outside.

At the rear end edge of this non-magnetic layer 109, there are parallelly disposed sense current feeding terminals 151 and 152 for the respective reproducing magnetic head elements 106, and terminals 161 and 162 for the thin-film coils 110 of the respective recording head elements 108.

The terminals 161 and 162 have connected thereto end portions of leads 108L made up of conductive layers led out from both terminals of the respective thin-film coils 110 of the respective recording head elements 108.

On the end portions of the sense current feeding leads 106L of the respective reproducing magnetic head elements 106 as are extended below the rear end edge of the insulating layer 112, there are bored through-holes 150 which are communicated with these leads 106L. Leads 106L are each connected to the respective terminals 151 and 152 by a conductive layer formed within this through-hole 150.

As described above, in the ordinary multichannel magnetic head, since two terminals are respectively led out from the respective magnetoresistive effect type reproducing magnetic head elements 106 and recording magnetic head elements 108, there are led out at least four terminals 151, 152 and 161, 162 with respect to each channel.

As a result, it is unavoidable that the number of terminals increases enormously and that the portion in which the terminals are arrayed occupies a large area of the whole of the magnetic head. This hinders the multichannel magnetic head from being miniaturized.

Moreover, in order to miniaturize the whole of the multichannel magnetic head, the space between the terminals and the space between the leads should be decreased by decreasing the width of the terminals or by reducing the widths of the lead portions themselves from which the terminals are led out. In this case, however, a resistance at the portion from which the terminal is led out increases, poor insulation, short-circuit occur between the terminals or between the leads and so forth, which causes characteristics of the magnetic head element to be fluctuated. Moreover, it is unavoidable that reliability and a yield of the magnetic head element are lowered.

SUMMARY OF THE INVENTION

In view of the aforesaid aspect, it is an object of the present invention to provide a multichannel magnetic head using magnetoresistive effect in which the number of terminals can be decreased.

It is another object of the present invention to provide a multichannel magnetic head using magnetoresistive effect in which the whole of a multichannel magnetic head can be miniaturized.

It is still another object of the present invention to provide a multichannel magnetic head using magnetoresistive effect in which the occurrence of short-circuit and poor insulation between the terminals or between the leads can be removed.

It is a further object of the present invention to provide a multichannel magnetic head using magnetoresistive effect in which the occurrence of fluctuations of element characteristics can be removed.

It is yet a further object of the present invention to provide a multichannel magnetic head using magnetoresistive effect which can become highly reliable.

It is still a further object of the present invention to provide a multichannel magnetic head using magnetoresistive effect the yield of which can be improved.

According to an aspect of the present invention, there is provided a multichannel magnetic head using magnetoresistive effect which is comprised of a first magnetic shield, a second magnetic shield, the first and second magnetic shields being opposed to each other and a plurality of magnetoresistive effect type reproducing magnetic head elements parallelly arrayed between the opposing first and second magnetic shields, wherein at least the first magnetic shield is formed of a conductive soft magnetic material.

The reproducing magnetic head elements comprised of ferromagnetic tunnel type magnetoresistive effect elements are parallelly arrayed on the first magnetic shield.

Electrodes on one side for applying the sense current to these ferromagnetic tunnel type magnetoresistive effect elements in the direction crossing a tunnel barrier layer are commonly constructed by the first magnetic shield and led out as a common one terminal.

Further, the multichannel magnetic head using magnetoresistive effect according to the present invention can be modified as a contact type magnetic head which comes in contact with a magnetic recording medium.

As described above, the multichannel magnetic head using magnetoresistive effect according to the present invention is comprised of the reproducing magnetic head elements formed of the ferromagnetic tunnel type magnetoresistive effect elements (TMR elements). One magnetic shield disposed across these magnetic head elements serves as electrodes on one side for applying the sense current to these ferromagnetic tunnel type magnetoresistive effect elements, whereby electrodes on one side for a plurality of reproducing magnetic head elements can be made common.

As described above, with respect to the reproducing magnetic head elements formed of a plurality of TMR elements, since electrodes on one side can be led out as one terminal, the number of the terminals can be decreased considerably, whereby the area of the portion in which the terminals are arrayed can be reduced and the interval between the terminals and the interval between the leads can be increased.

Furthermore, since this TMR element is the element having a large resistance with respect to the direction in which the sense current is applied, when a contact type magnetic head which comes in contact with a magnetic recording medium is comprised of this TMR element, even though the area of the reproducing head element is increased, sufficiently large resistance can be maintained so that a high magnetoresistive effect ratio (MR ratio) can be obtained.

DESCRIPTION OF THE PREFERRED EMBODIMENT

The present invention will now be described in detail with reference to the drawings.

Figure 1:
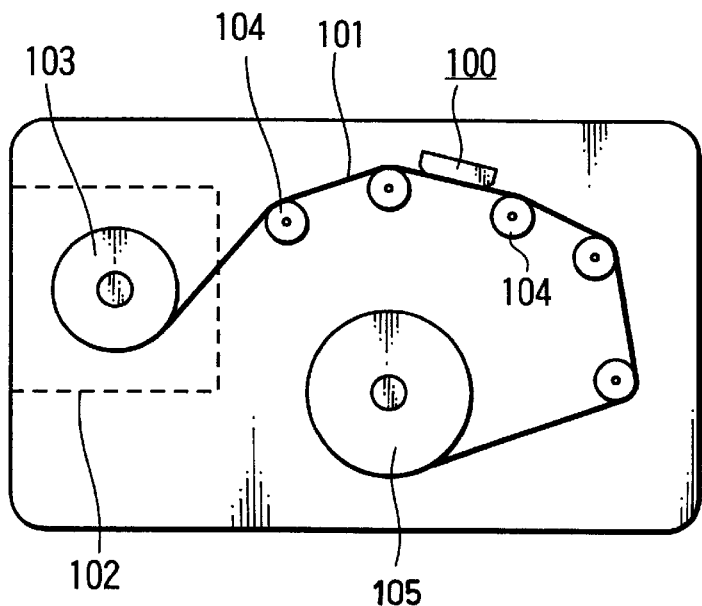
FIG. 1 is a schematic diagram showing an arrangement of a magnetic tape drive apparatus to which a multichannel magnetic head using magnetoresistive effect can be applied.
Figure 2:
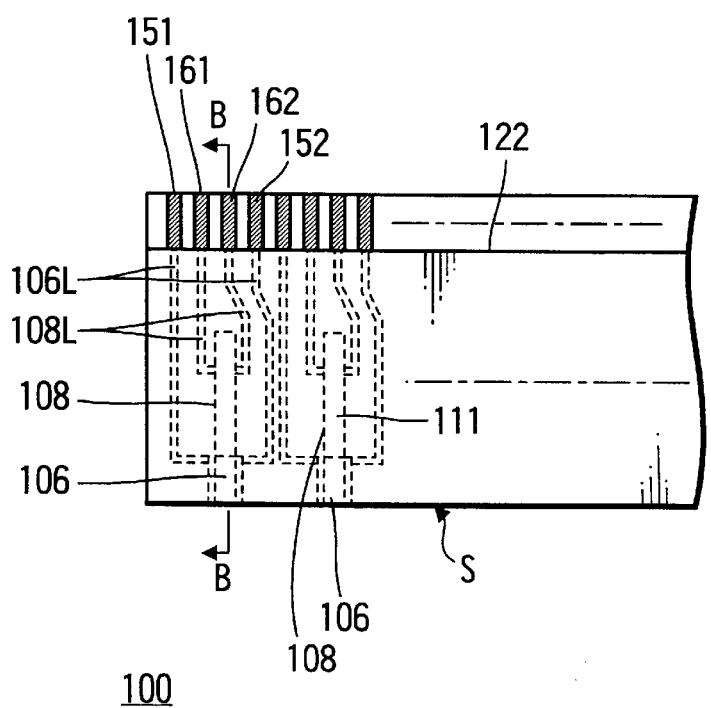
FIG. 2 is a schematic plan view showing a main portion of a multichannel magnetic head using magnetoresistive effect according to the related art.
Figure 3:
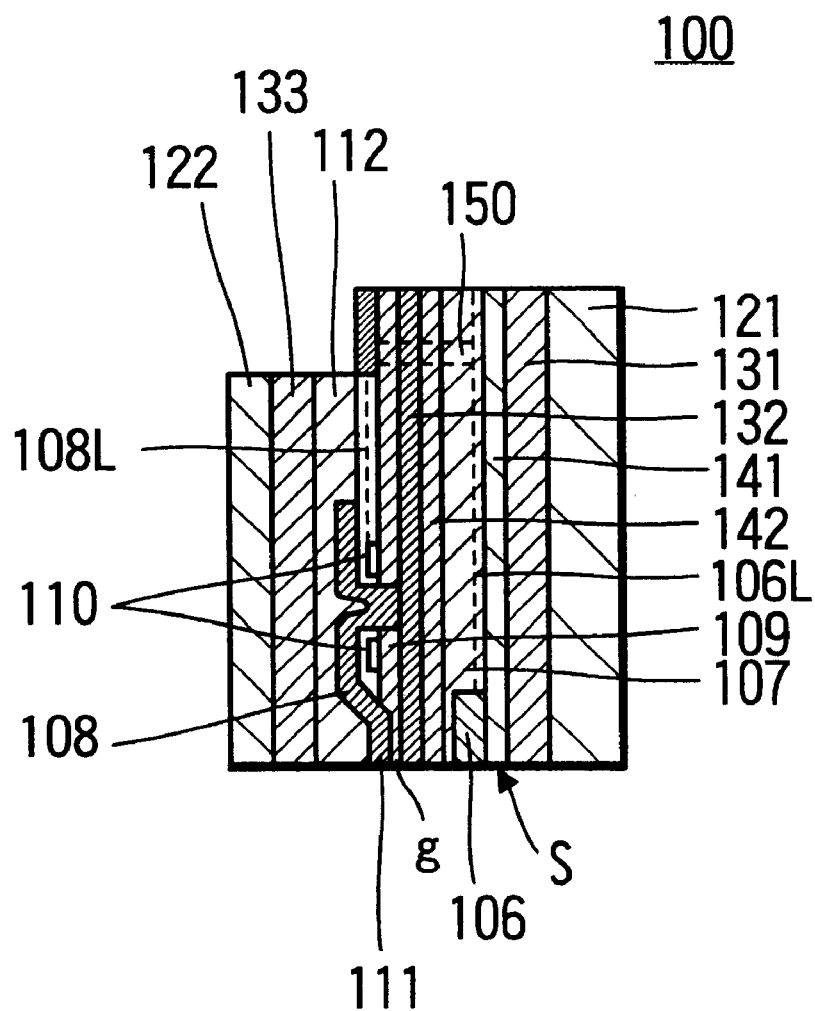
FIG. 3 is a schematic cross-sectional view taken along the line III—III in FIG. 2.

A multichannel magnetic head using magnetoresistive effect according to the present invention can be applied to the multichannel magnetic head using magnetoresistive effect based upon the arrangement in which this multichannel magnetic head using magnetoresistive effect comes in slidable contact with the magnetic tape as earlier explained with reference to FIG. 1, for example.

Figure 4:
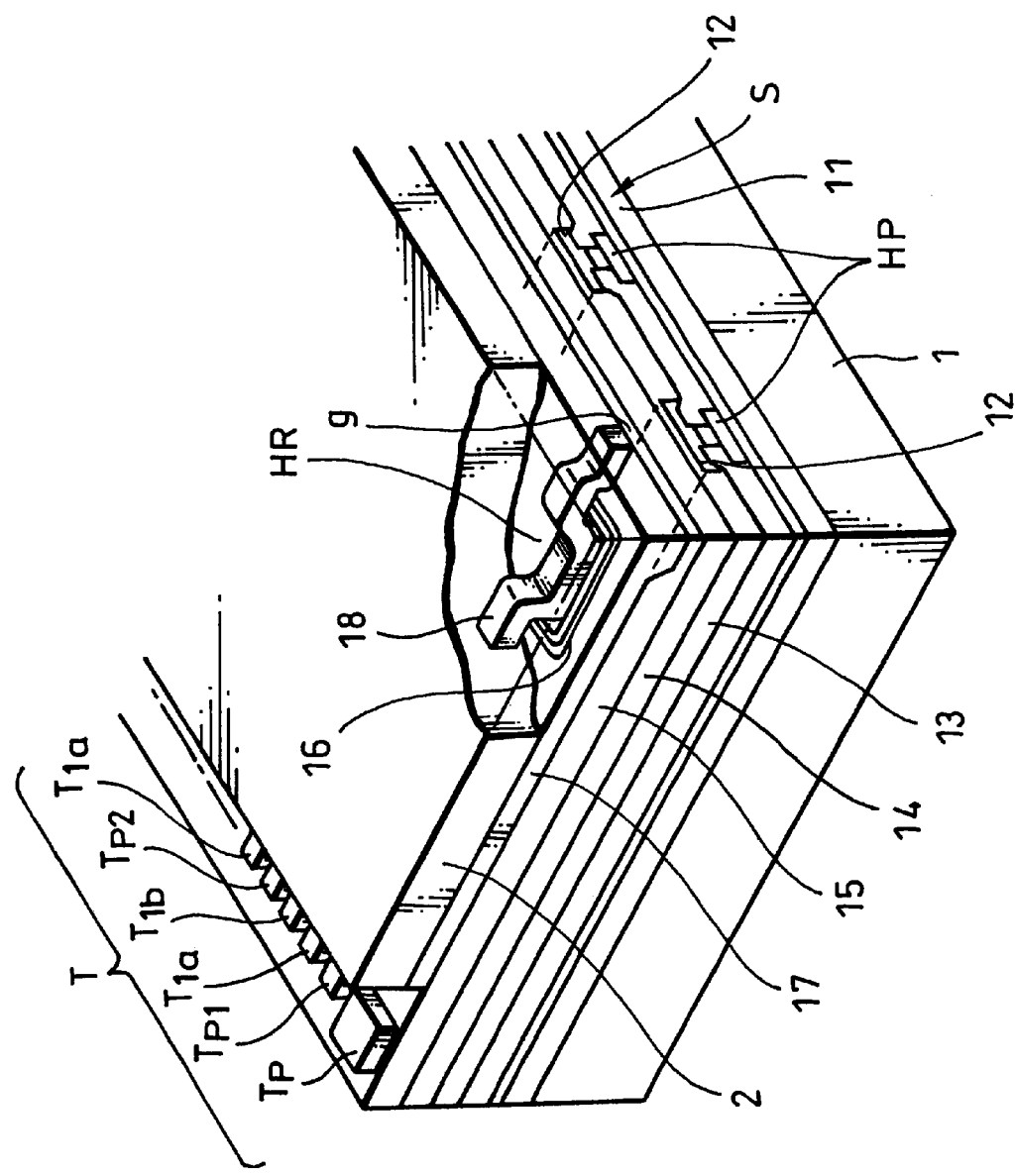
FIG. 4 is a perspective view showing a partially-exploded main portion of a multichannel magnetic head using magnetoresistive effect according to the present invention obtained when this multichannel magnetic head using magnetoresistive effect is applied to a recording and reproducing magnetic head.

FIG. 4 is a partly-exploded perspective view showing a main portion of a multichannel magnetic head using magnetoresistive effect according to an embodiment of the present invention. In this embodiment, the mmultichannel magnetic head using magnetoresistive effect according to the present invention is formed as a multichannel magnetic head using magnetoresistive effect of a magnetic recording and reproducing type.

In this case, a multichannel magnetic head using magnetoresistive effect has an arrangement in which a reproducing magnetic head element HP based upon a ferromagnetic tunnel type magnetoresistive effect element (TMR element) and an electromagnetic induction type recording magnetic head element HR are laminated and thereby formed as one body at every channel.

Figure 5:
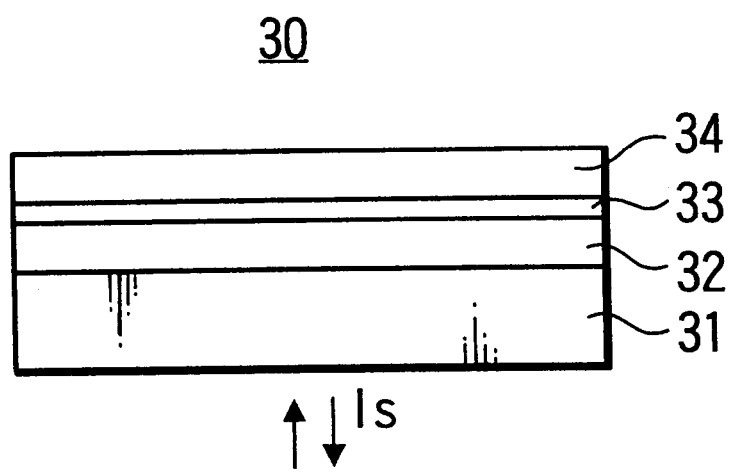
FIG. 5 is a schematic cross-sectional view showing a fundamental structure of a magnetoresistive effect element (TMR element) of a magnetic head according to the present invention.

FIG. 5 is a schematic cross-sectional view showing a fundamental structure of a magnetoresistive effect element (TMR element) of a magnetic head according to the present invention.

As shown in FIG. 5, the reproducing magnetic head element HP includes a TMR element 30 in which at least a first anti-ferromagnetic layer 31, a fixed magnetic layer 32, a tunnel barrier layer 33 and a free magnetic layer 34 are laminated. A sense current IS flows through the TMR element 30 in the direction perpendicular to the film planes of those layers.

In accordance with the present invention, as shown in FIG. 4, a large number of reproducing magnetic heads HP are parallelly arrayed on a first guard substrate 1. Electrodes on one side for supplying the sense current to all the reproducing magnetic head elements HP, for example, are comprised of a first common magnetic shield and electrodes 11.

Then, on the respective reproducing magnetic head elements HP, there are parallelly arrayed second magnetic shield and electrodes 12 in opposing relation to the above-mentioned first magnetic shield and electrodes 11 in such a manner that these reproducing magnetic head elements HP are sandwiched by the second magnetic shield and electrodes 12.

A magnetic layer 14 is formed on the second magnetic shield and electrode 12 through a non-magnetic insulting layer 13. A non-magnetic insulating layer 15 is formed on this magnetic layer 14. On this non-magnetic insulating layer 15, there is formed a head winding 16 formed of a conductive thin film and thereupon is formed a non-magnetic insulating layer 17. A though-hole (not shown) is bored through this non-magnetic insulating layer 17 and the insulating layer 15 so as to extend through the central portion of the head winding 16. A belt-like magnetic core 18, for example, is formed on the non-magnetic insulating layer 17, and a part of the belt-like magnetic core 18 is magnetically coupled to the magnetic layer 14 through the through-hole of the non-magnetic insulating layers 17 and 15.

In this manner, there is constructed the electromagnetic induction type recording magnetic head element HR in which the magnetic core 18 and the magnetic core 14 constitute a closed magnetic circuit, the head winding 16 is wound around this closed magnetic circuit and in which a magnetic gap g whose gap length is prescribed by the non-magnetic insulating layer 15 having the predetermined thickness is formed on a sliding surface S at which the electromagnetic induction type recording magnetic head HR comes in slidable contact with a magnetic recording medium (not shown).

Then, a second guard substrate 2 having a depth smaller than that of the first guard substrate 1 is bonded to the mmultichannel magnetic head using magnetoresistive effect covering the portion in which the recording magnetic head elements HR are arrayed.

With this arrangement, according to the present invention, with respect to each reproducing magnetic head HP formed of the TMR element, the first magnetic shield and electrodes 11 is made common and the sense current $I_s$ is applied to the space between the first magnetic shield and electrodes 11 and the second magnetic shield and electrodes 12 provided with respect to each reproducing magnetic head HP.

In the multichannel magnetic head using magnetoresistive effect according to the present invention, the terminals are arrayed on the g portion which is not covered with the second guard substrate 2, for example.

When these terminals are led out from this multichannel magnetic a head using magnetoresistive effect according to the present invention, electrode terminals TPa on one side as are common to a plurality of reproducing magnetic head elements HP are led out from the common first magnetic shield and electrodes 11, and respective electrode terminals TPb on the other side for the respective reproducing magnetic head elements HP are led out from the second magnetic shield and electrodes 12.

Further, terminals TRa and TRb are respectively led out from both terminals of the head winding 16 of each recording magnetic head element HR.

Next, for the sake of facilitating comprehension, the multichannel magnetic head using magnetoresistive effect according to an embodiment of the present invention will be described below in detail together with an example of a manufacturing method thereof.

Figure 7:
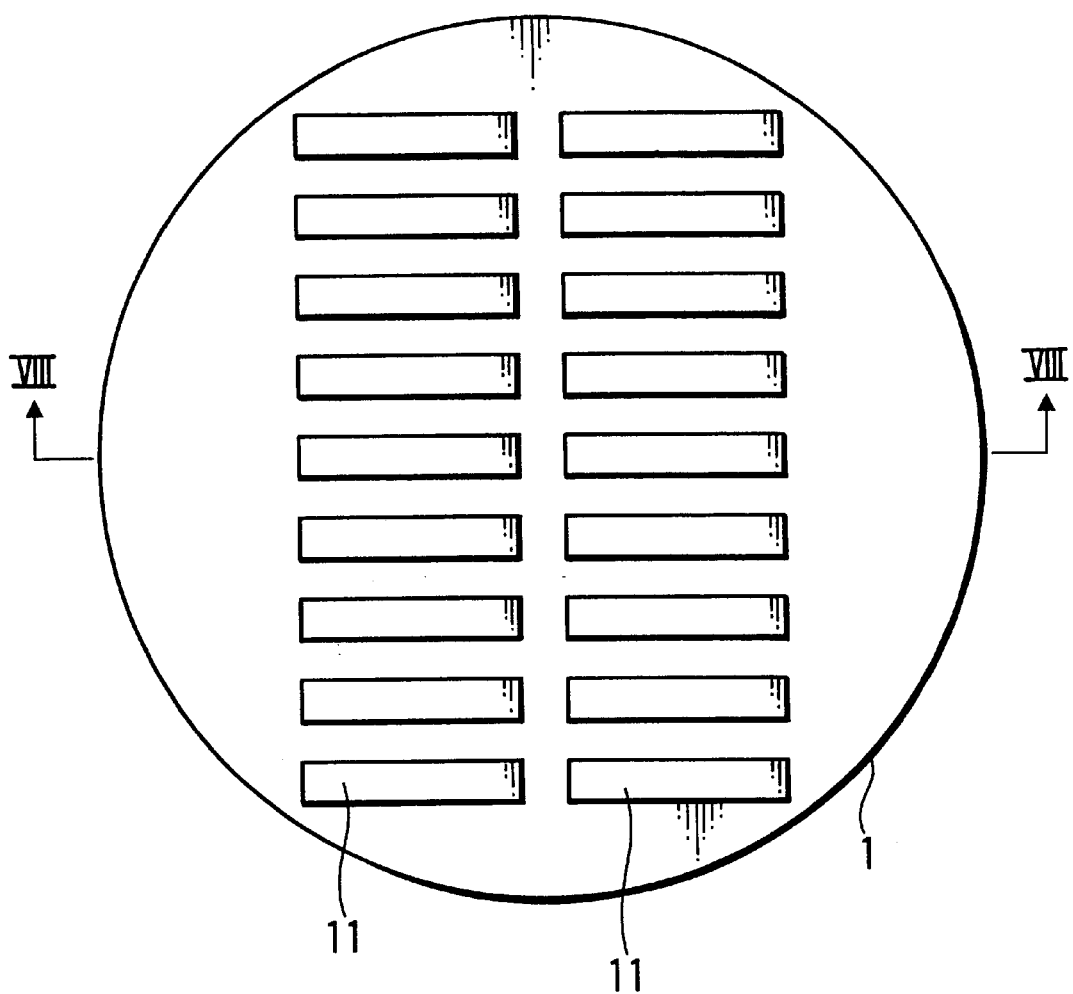
FIG. 7 is a plan view showing one process of the manufacturing method of the multichannel magnetic head using magnetoresistive effect according to an embodiment of the present invention.
Figure 8:
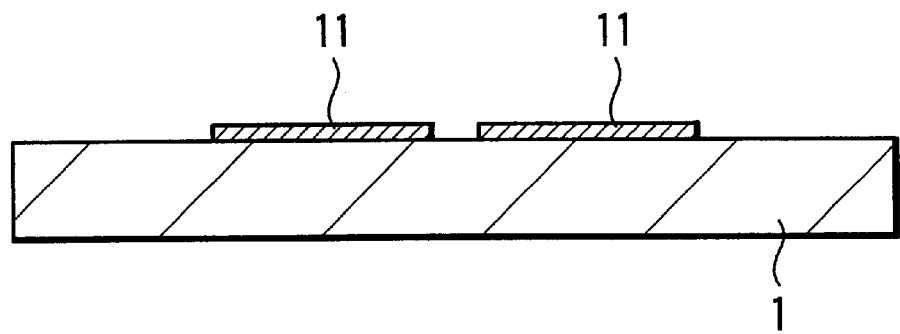
FIG. 8 is a schematic cross-sectional view taken along the line VIII—VIII in FIG. 7.

In this embodiment, let us describe the case in which a plurality of multichannel magnetic head using magnetoresistive effects are formed simultaneously. FIG. 7 is a schematic plan view showing one process of a manufacturing method of a multichannel magnetic head using magnetoresistive effect according to an embodiment of the present invention. FIG. 8 is a schematic cross-sectional view taken along the line VIII—VIII in FIG. 7. As illustrated, there is constructed the wafer-like first guard substrate 1 made up of AlTiC, for example, comprising a plurality of multichannel magnetic head using magnetoresistive effects.

As illustrated, on this first guard substrate 1, first magnetic shield and electrodes 11 formed of, for example, conductive soft magnetic thin-films are formed, by deposition, into belt-like patterns, respectively corresponding to the portions where the respective multichannel magnetic head using magnetoresistive effects are ultimately formed.

This first magnetic shield and electrode 11 can be formed in such a manner that the whole surface of a soft magnetic material, e.g., NiFe having a thickness of 2 micrometers is formed by plating and then patterned by dry etching using photolithography.

Figure 11A:
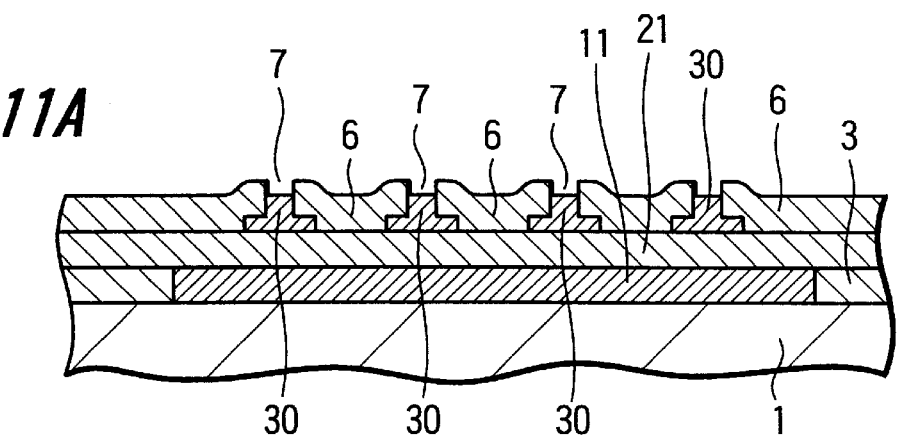
FIGS. 11A to 11C are schematic cross-sectional views illustrating the main portions of the respective processes of the magnetic head manufacturing method according to an embodiment of the present invention, respectively.
Figure 11B:
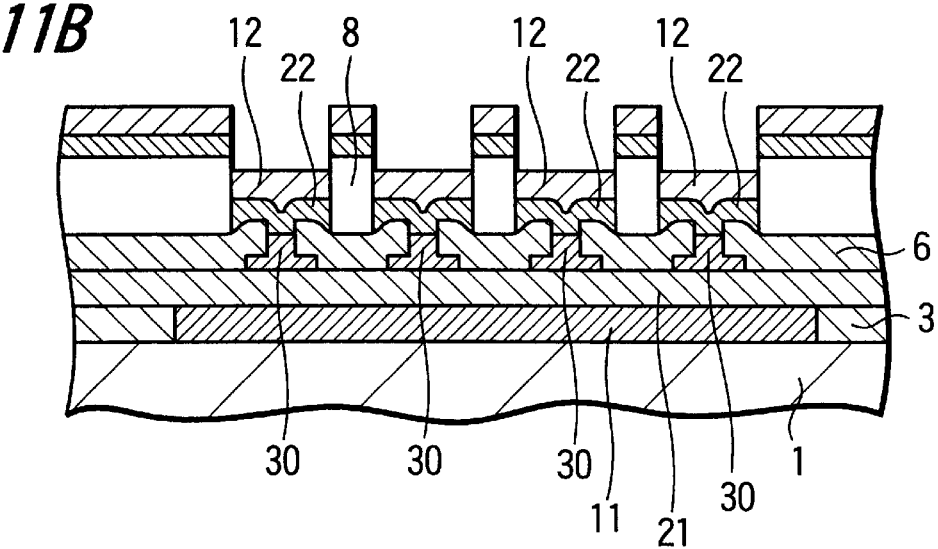
Figure 11C:
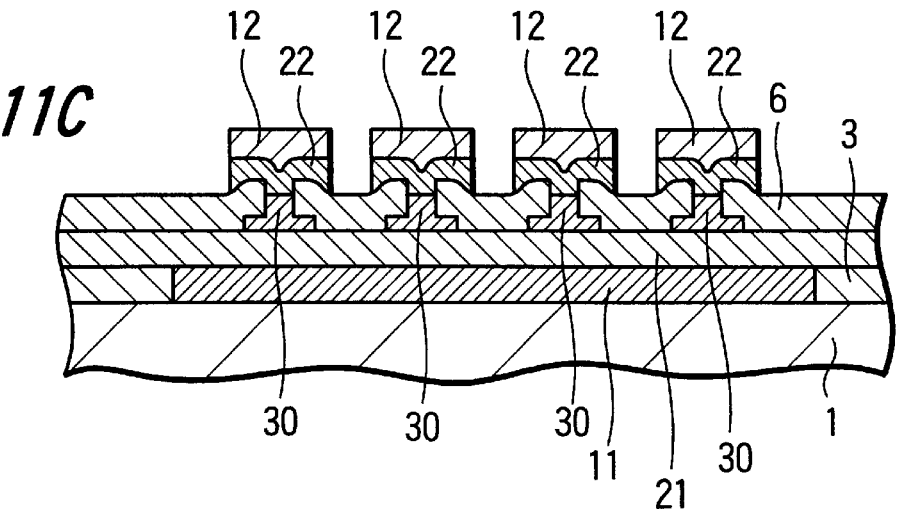
Figure 12:
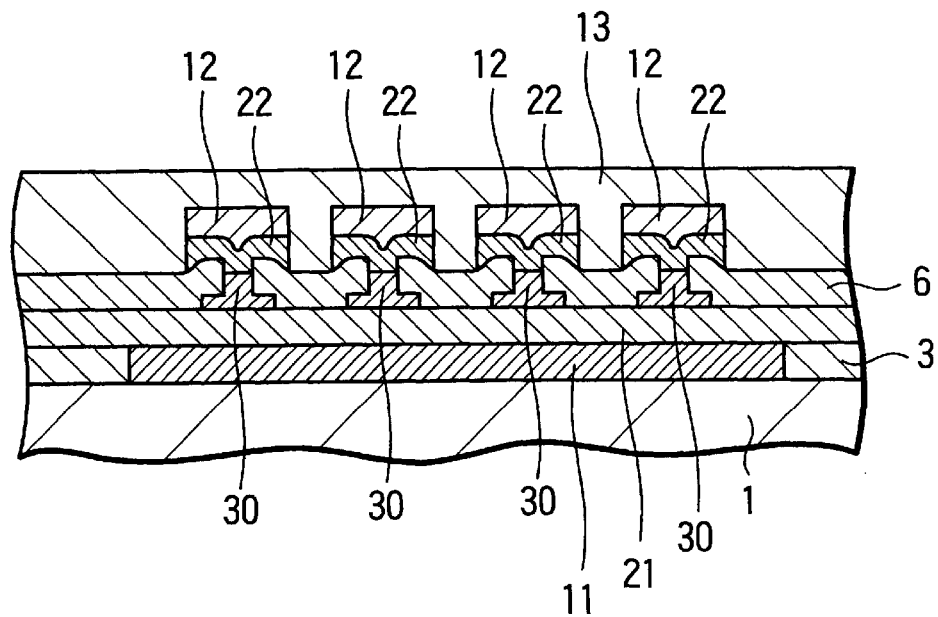
FIG. 12 is a schematic cross-sectional view illustrating the main portion of one example of the magnetic head manufacturing method according to an embodiment of the present invention.
Figure 13:
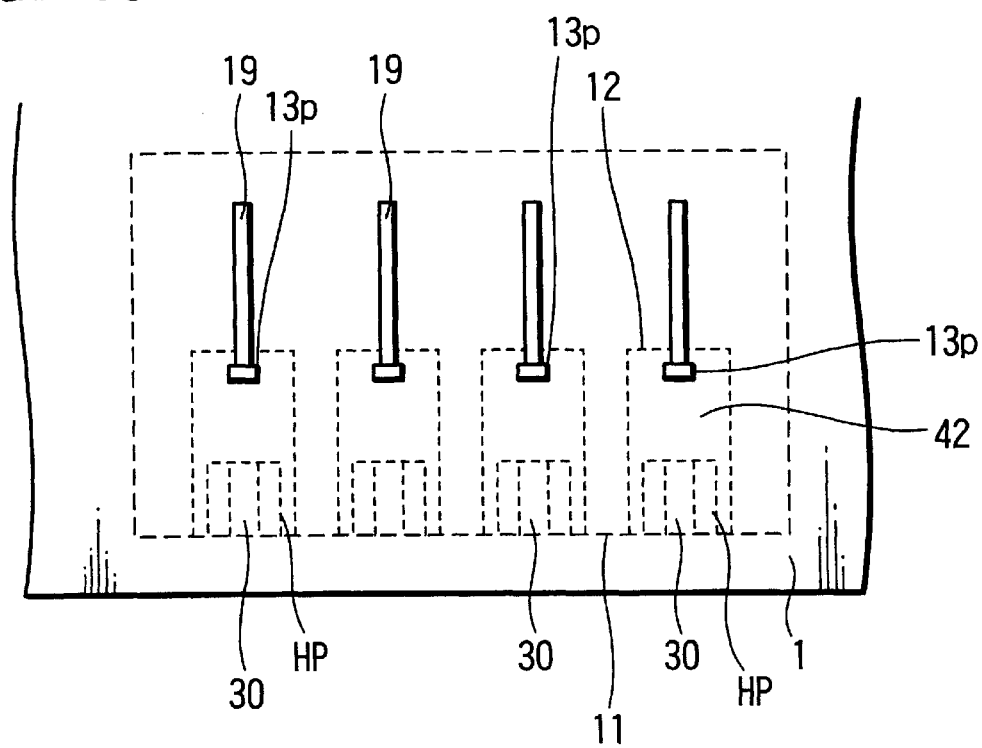
FIG. 13 is a schematic plan view illustrating the main portion of one process of the magnetic head manufacturing method according to an embodiment of the present invention.

While the multichannel heads are simultaneously formed on these first magnetic shield and electrodes 11, respectively, cross-sectional views in respective processes in FIGS. 8 to 12 and a plan view of FIG. 13 typically illustrate one first magnetic shield and electrode 11, i.e., one multichannel magnetic head using magnetoresistive effect.

Figure 9A:
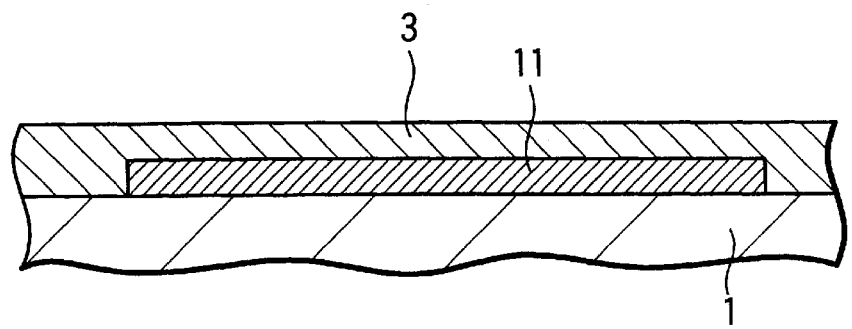
FIGS. 9A through 9D are schematic cross-sectional views illustrating the main portions of the respective processes of the magnetic head manufacturing method according to an embodiment of the present invention, respectively.

As shown in FIG. 9A, a non-magnetic insulating layer 3 made of a non-magnetic material such as A1203 is formed by sputtering so as to bury the first magnetic shield and electrode 11.

Figure 9B:
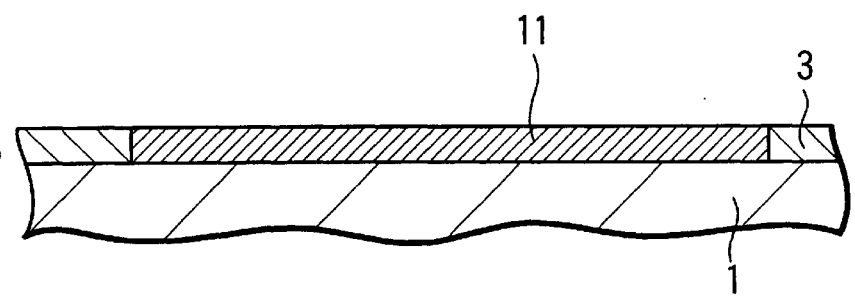

Then, the surface is flattened by polishing this insulating layer 3 from the surface to the position at which the first magnetic shield and electrode 11 is exposed by CMP (chemical mechanical polish) as shown in FIG. 9B.

Figure 9C:
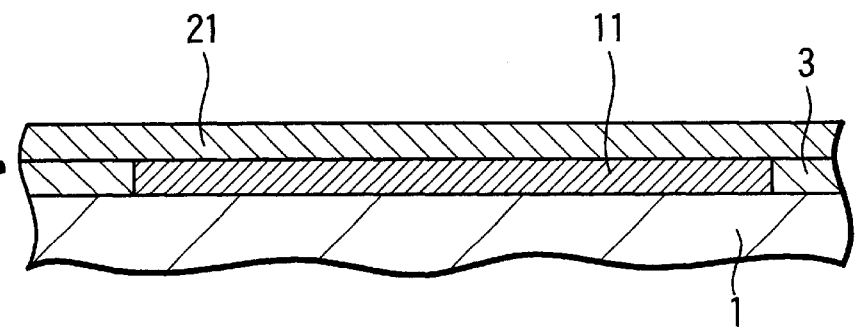

Then, as shown in FIG. 9C, a first magnetic gap layer 21 is formed on the whole of the flattened surface by sputtering a non-magnetic conductive material, e.g., Cu as thick as 100 nanometers.

Figure 9D:
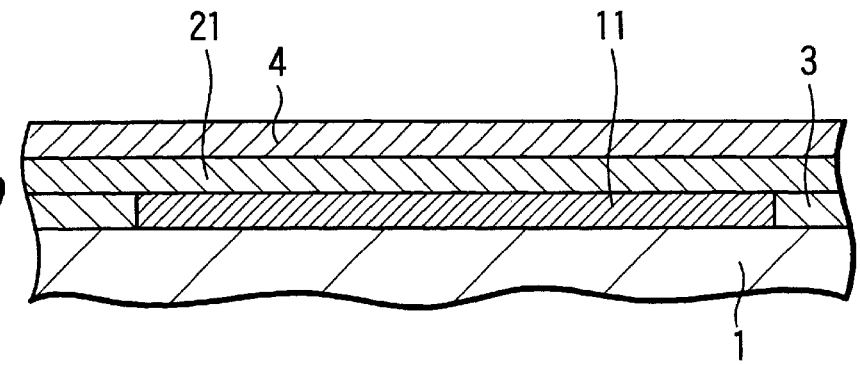

Subsequently, as shown in FIG. 9D, a TMR laminated layer arrangement film 4 comprising a ferromagnetic tunnel type magnetoresistive effect element (TMR element) is formed on this first magnetic gap layer 21.

Figure 6A:
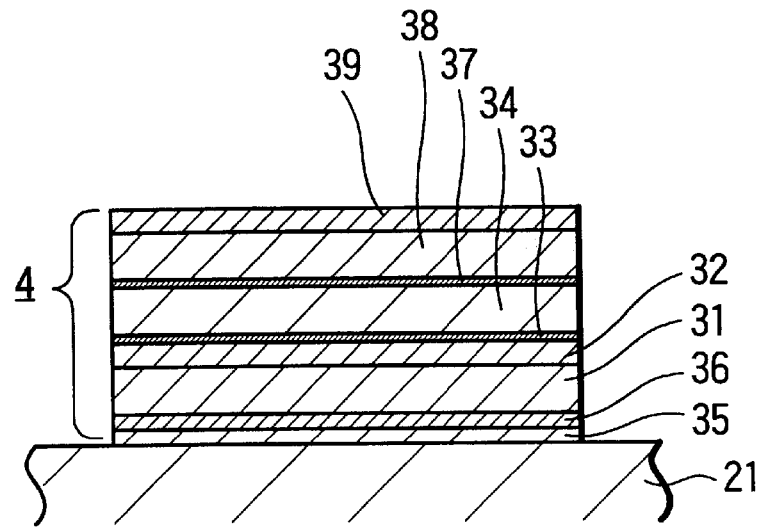
FIGS. 6A and 6B are schematic cross-sectional views illustrating manufacturing processes of the TMR element of the multichannel magnetic head using magnetoresistive effect according to the present invention, respectively.

While this TMR laminated layer arrangement film 4 has the arrangement shown in FIG. 5, in this embodiment, as shown in the cross-sectional view of FIG. 6A, for example, the TMR laminated layer arrangement film 4 can be formed in such a manner that a first underlayer 35 having a thickness of 3 nanometers of Ta, a second underlayer 36 having a thickness of 3 nanometers of NiFe, a first anti-ferromagnetic layer 31 having a thickness of 10 nanometers of IrMn, a fixed magnetic layer 32 having a thickness of 4 nanometers of CoFe, a tunnel barrier layer 33 having a thickness of 1.3 nanometers, a free magnetic layer 34 having a two-layer structure of a layer having a thickness of 4 nanometers of CoFe and a layer having a thickness of 5 nanometers of NiFe, a non-magnetic spacer layer 37 having a thickness of 0.8 nanometer, a second anti-ferromagnetic layer 38 having a thickness of 15 nanometers of IrMn and a protecting layer 39 having a thickness of 5 nanometers of Ta can be formed on the first magnetic gap layer 21 by sputtering, in that order.

Figure 10A:
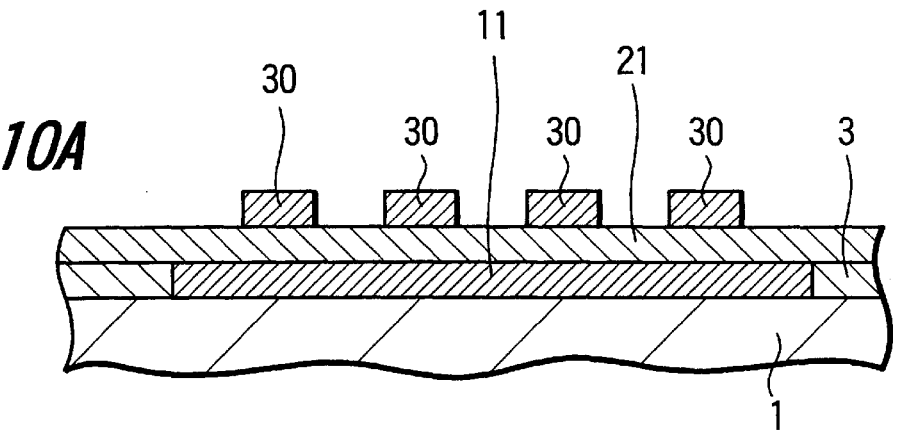
FIGS. 10A to 10C are schematic cross-sectional views illustrating the main portions of the respective processes of the magnetic head manufacturing method according to an embodiment of the present invention, respectively.
Figure 10B:
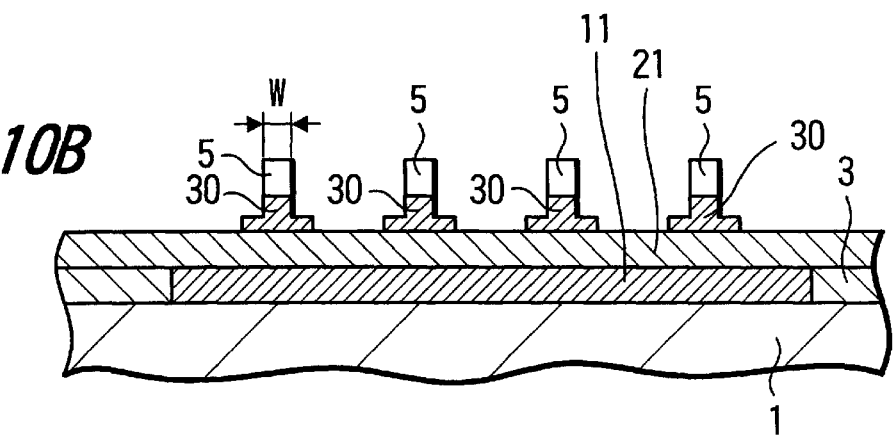
Figure 10C:
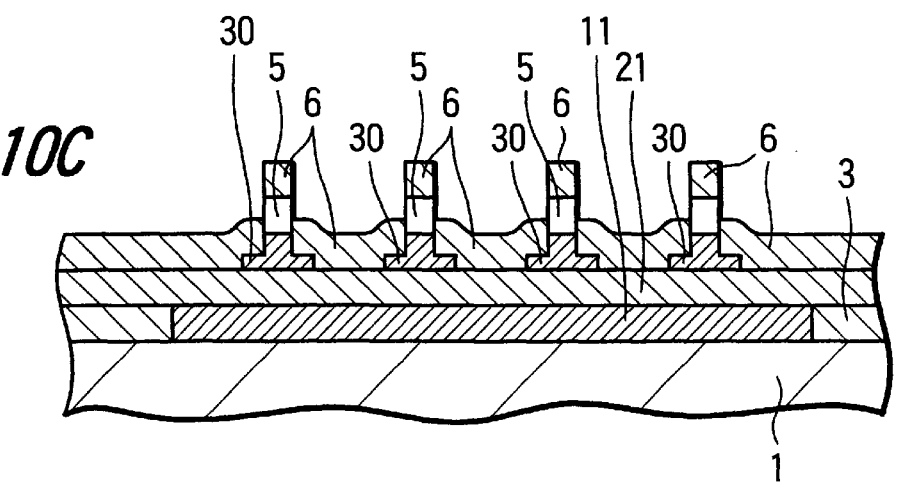

However, it is needless to say that the TMR laminated layer arrangement film 4 is not limited to the above-mentioned example Then, the patterning is effected on this TMR laminated layer arrangement film 4 by ion etching using photolithography, whereby a large number of TMR elements 30 (four TMR elements 30 are typically illustrated in FIG. 10C) are linearly arrayed on each first magnetic shield and electrode 11 such that a part of each laminated layer arrangement film 4 may be left as shown in FIG. 10C.

Figure 6B:
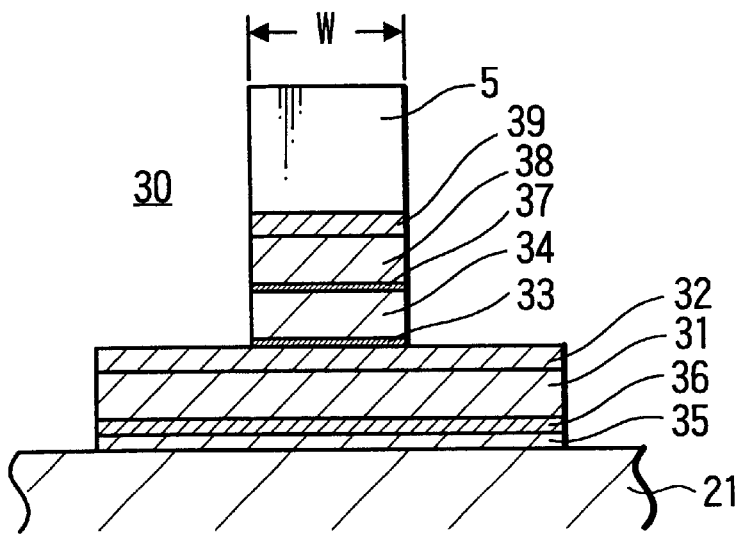

Next, as shown in FIGS. 10B and 6B, a mask 5, e.g., photoresist layer having a predetermined width w is formed on a central portion of each TMR element 30 by pattern exposure and development.

The width W of this mask 5 is selected to be a width which becomes coincident with the track width of each TMR element 30 which is ultimately formed.

Then, while this mask 5 is being used as an etching mask, the operation portion of the TMR element 30 is etched. Specifically, the TMR element 30 is etched to a depth from the upper surface through the tunnel barrier layer 33 and to a depth such that the layers down from, at least, the first anti-ferromagnetic layer 31 are remaining.

Thereafter, as shown in FIG. 10C, the non-magnetic insulating layer 6 made of a non-magnetic material such as A1203 is formed on the whole surface by a suitable method such as sputtering or the like.

Next, as shown in FIG. 11A, when the mask 5 shown in FIG. 10C is removed, the insulating layer 6 is lifted off with the result that an electrode contact-hole 7 is produced on the operation portion of each TMR element 30.

In this manner, as shown in FIG. 11C, the second magnetic gap layers 22, each having conductivity, are formed on the insulating layer 6 with the contact holes 7 produced thereon such that they may cover the respective TMR elements 30. Then, the second magnetic shield and electrodes 12 are formed on the second magnetic gap layers 22.

To this end, as shown in FIG. 11B, the lift-off mask 8 made of the photoresist, for example, is formed on the portions except for the portions in which the above-mentioned second magnetic gap layers 22 and the second magnetic shield and electrodes 12 are formed by photolithography. Then, a conductive material forming the second gap layers 22, for example, Ta is formed on the whole surface by sputtering. Subsequently, a film forming the second magnetic shield and electrodes 12, e.g., a soft magnetic amorphous laminated layer film, e.g., CoZrNbTa having a thickness of about 2.3 micrometers is formed on the whole surface by sputtering.

Thereafter, the second magnetic gap layers 22 and the second magnetic shield and electrodes 12 having the predetermined patterns shown in FIG. 11C can be formed by removing the photoresist layer.

In this manner, on the common first guard substrate 1, there are arrayed a plurality of multichannel magnetic head portions in which a plurality of TMR elements 30 are arrayed on the common first magnetic shield and electrode 11 through the conductive first magnetic gap 21 and in which the second magnetic shield and electrodes 12 are formed with respect to the respective TMR elements 30 through the conductive second magnetic gap layers 22.

Further, as shown in FIG. 12, a non-magnetic insulating layer 13 made of a non-magnetic material such as A1203 is formed on the whole surface.

On this non-magnetic insulating layer 13, there are bored through-holes 13P which expose one portion of, for example, the rear end portions of the respective second magnetic shield and electrodes 12 to the outside by, for example, photolithography as shown in FIG. 13 which is a plan view of the cross-sectional view of FIG. 12.

Then, leads 19 for leading out terminals which electrically contact one ends to the respective second magnetic shield and electrodes 12 through these through-holes 13P, e.g., Cu conductive layers are extended to the rear end edge portion of the insulating layer 13 by sputtering and patterning using photolithography.

In this fashion, there are arrayed the reproducing magnetic head elements HP in which the TMR elements 30 are respectively formed between the common first magnetic shield and electrode 11 and the second magnetic shield and electrodes 12 formed individually.

In this reproducing magnetic head element HP, when required applying-magnetic-field heat treating is carried out, magnetization of the fixed magnetic layer 32 is fixed to the detecting magnetic field introduced into the reproducing magnetic head element HP by interactive-exchange-coupling with the first anti-ferromagnetic layer 31, i.e., the magnetization in the direction extended along the direction of the signal magnetic field based upon recorded information from the magnetic recording medium. On the other hand, a stabilizing bias magnetic field for setting magnetization in the direction perpendicular to the magnetization direction of the fixed magnetic layer 32 is applied to the whole area of the free magnetic layer 34 of the TMR element by the second anti-ferromagnetic layer 38 under the state in which a signal magnetic field is not applied to the free magnetic layer 34 by a required long-range interactive-exchange-coupling energy controlled based on the thickness of, for example, the non-magnetic spacer 37.

Thereafter, when the recording and reproducing type multichannel magnetic head using magnetoresistive effect is constructed on the portion in which the reproducing magnetic head elements HP are arrayed as already described with reference to FIG. 4, the magnetic layer 14, the head winding 16, the insulating layer 17, the magnetic core 18, the second guard substrate 2 and so forth are formed.

Then, toward the rear side from this guard substrate 2, there are respectively formed and arrayed the common terminal $TP_a$ which is brought in electrical contact with the first magnetic shield and electrode 11 through the contact hole formed up to the first magnetic shield and electrode 11, terminals Tb . . . , connected to the rear ends of the leads 19 extended from the second magnetic shield and electrodes 12 toward the rear side of the second guard substrate 2 and a couple of terminals TRa, TRb . . . , respectively connected to the respective terminals of the head winding 16 by Au layers, for example.

Then, the wafer-like substrate 1 is cut with respect to each multichannel magnetic head using magnetoresistive effect, the front surface is polished and thereby the sliding surface S with the magnetic recording medium is formed. In this embodiment, the TMR element 30 of each reproducing magnetic head element HP is directly faced to the sliding surface S and each magnetic gap g of the recording magnetic head element HR is disposed in a facing relation to the sliding surface S.

However, when the TMR element 30 is directly exposed to the sliding surface S with the magnetic recording medium as described above, the TMR element 30 is worn and considerably affected by heat and noises generated when the TMR element 30 is brought in slidable contact with the magnetic recording medium. Then, there arise problems as to reliability and a life of the recording. In order to obviate the above-mentioned disadvantages, although not shown, a magnetic flux guide may magnetically be coupled at the front of the TMR element 30 and the front end of this magnetic flux guide may be faced to the sliding surface S, whereby the signal magnetic field, introduced into the first and second magnetic shield and electrodes from the magnetic recording medium, may be introduced into the TMR element 30.

As described above, according to the arrangement of the present invention, in the multichannel magnetic head using magnetoresistive effect in which the first and second magnetic shields are disposed, the common magnetic shield and electrodes on one side of a large number of magnetoresistive effect elements, i.e., TMR elements are made common, whereby the number of channels can be decreased from 2 n (this is the ordinary case) to n+1 where n represents the number of channels.

As described above, in the multichannel magnetic head using magnetoresistive effect, since its reproducing magnetic head elements are comprised of, in particular, the ferromagnetic tunnel type magnetoresistive effect elements (TMR elements), the direction in which the sense current is applied is set to the direction crossing the tunnel barrier layer, i.e., electrodes on one side are comprised of the first magnetic shield common to a plurality of channels.

Specifically, since electrodes on one side can be led out as one terminal with respect to a plurality of TMR elements, the number of terminals can be decreased remarkably.

As a consequence, the area of the portion in which the terminals are arrayed can be reduced, whereby the interval between the terminals and the interval between the leads led out can be increased. Therefore, when the multichannel magnetic head using magnetoresistive effect is formed as the magnetic recording and reproducing head arrangement in which the recording magnetic head elements are laminated and integrally laminated on the portion where the reproducing magnetic head elements, each having terminals in enormous numbers, are arrayed, insulation property between the leads led out from the terminals can be improved, the short-circuit accident can be avoided, the multichannel magnetic head using magnetoresistive effect can be made highly reliable, and the yield of the multichannel magnetic head using magnetoresistive effect can be improved.

Furthermore, since the reproducing head elements are comprised of the TMR elements which are the elements whose resistance with respect to the direction in which the sense current is applied is large, when the contact type magnetic head which comes in contact with the magnetic recording medium is comprised of this multichannel magnetic head using magnetoresistive effect, even though the areas of the reproducing head elements increase, a sufficiently large resistance can be maintained with the result that a high magnetoresistive effect ratio (MR ratio) can be obtained.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. In a multichannel magnetic head using the magnetoresistive effect comprising:

a first magnetic shield;

a second magnetic shield, said first and second magnetic shields being opposed to each other; and a plurality of magnetoresistive effect type reproducing magnetic head elements arrayed in parallel between said opposing first and second magnetic shields, wherein at least said first magnetic shield is made of a conductive soft magnetic material, said reproducing magnetic head elements are constructed on said first magnetic shield by ferro-magnetic tunnel type magnetoresistive effect elements and electrodes on one side for applying sense current to said plurality of ferromagnetic tunnel type magnetoresistive effect elements are commonly formed by said first magnetic shield and led out as a single common terminal.

2. A multichannel magnetic head using the magnetoresistive effect according to claim 1, wherein said multichannel magnetic head using the magnetoresistive effect is a contact type multichannel magnetic head using the magnetoresistive effect having a sliding surface in which it is brought in slidable contact with a magnetic recording medium.

3. A multichannel magnetic head using the magnetoresistive effect according to claims 1 or 2, wherein said multichannel magnetic head using the magnetoresistive effect is a multichannel recording and reproducing head including a plurality of recording magnetic head elements unitarily arrayed on the portion in which said reproducing magnetic head elements are arrayed corresponding to said reproducing magnetic head elements.

* * * * *